(12) United States Patent
Oetiker

(10) Patent No.: US 6,224,066 B1
(45) Date of Patent: May 1, 2001

(54) BELLOWS-TYPE COVER WITH INTEGRATED CLAMPING MEMBER

(75) Inventor: Hans Oetiker, Horgen (CH)

(73) Assignee: Hans Detiker Maschinen-und Apparate fabrik, Horgen (CH)

( * ) Notice: Subject to any disclaimer, the term of this patent is extended or adjusted under 35 U.S.C. 154(b) by 0 days.

(21) Appl. No.: 09/379,633

(22) Filed: Aug. 24, 1999

Related U.S. Application Data

(63) Continuation of application No. 08/804,078, filed on Feb. 21, 1997.
(60) Provisional application No. 60/018,024, filed on May 21, 1996.

(51) Int. Cl.⁷ .................................................. F16J 15/52
(52) U.S. Cl. .............................. 277/634; 24/297; 24/662; 277/637
(58) Field of Search ..................... 464/170, 173, 464/175; 403/50, 51; 277/634, 635, 636, 637; 24/297, 300, 562, 662; 285/242.23; 29/418

(56) References Cited

U.S. PATENT DOCUMENTS

| | | | |
|---|---|---|---|
| 3,447,229 | * | 6/1969 | Clark .................................. 29/418 X |
| 3,938,237 | * | 2/1976 | Dunz ................................. 285/242 X |
| 4,410,295 | * | 10/1983 | Ersoy et al. ....................... 29/418 X |
| 4,755,078 | | 7/1988 | Blumberg et al. . |
| 4,786,272 | | 11/1988 | Baker . |
| 4,936,811 | | 6/1990 | Baker . |
| 5,094,894 | * | 3/1992 | Schafferus et al. .............. 277/637 X |
| 5,183,136 | | 2/1993 | Maeda et al. . |
| 5,183,351 | | 2/1993 | Schneider . |
| 5,622,391 | * | 4/1997 | Belik ..................................... 285/23 |

FOREIGN PATENT DOCUMENTS

| | | |
|---|---|---|
| 8804280 | 10/1988 | (DE) . |
| 3727871 | 3/1989 | (DE) . |
| 4413664 | 12/1994 | (DE) . |
| 0545629 | 6/1993 | (EP) . |
| 2287073 | 9/1995 | (GB) . |
| 87/03345 | * 6/1987 | (WO) ..................................... 24/562 |

* cited by examiner

*Primary Examiner*—Lynne H. Browne
*Assistant Examiner*—Greg Binda

(57) ABSTRACT

A bellows-type cover into which a clamping member is adapted to be securely integrated to form a preassembled unit; the groove-shaped recess near one end of the bellows-type cover adapted to receive the clamping member has a two-tier positioning arrangement with a radially inward, circumferentially extending bottom surface for engagement by the clamping member when fully tightened and with a temporary bottom for the clamping member to provide a releasable self-retaining support for the closed, but not yet fully tightened clamping member at a radial distance between the bottom surface and the radially outer limit of the recess.

16 Claims, 1 Drawing Sheet

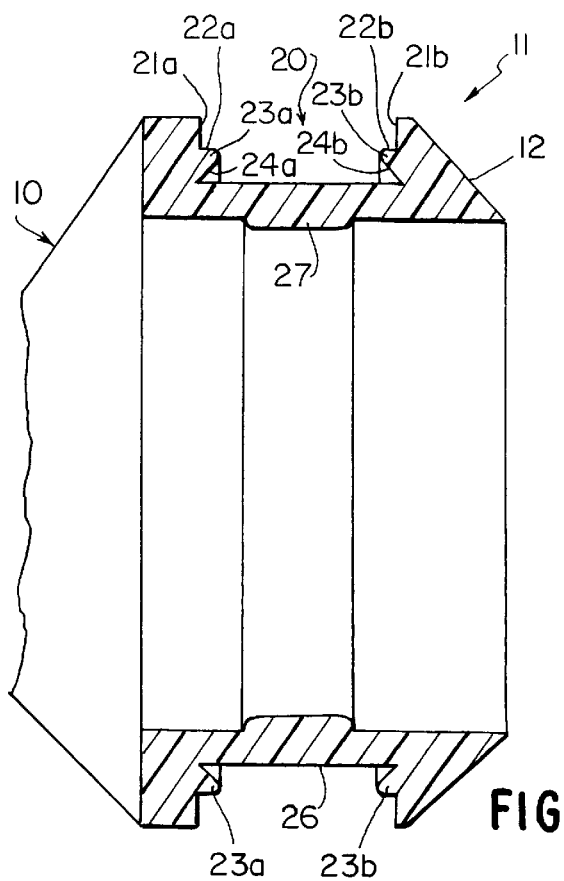
FIG.1
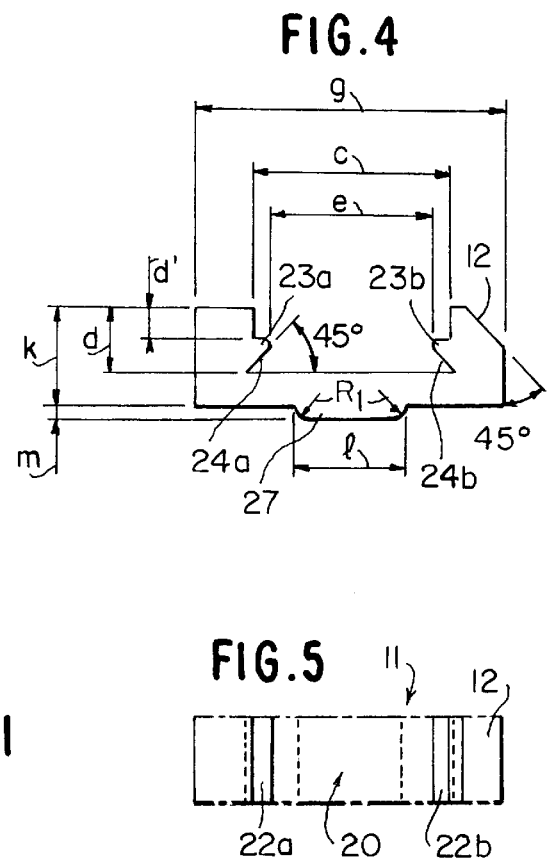
FIG.4
FIG.5
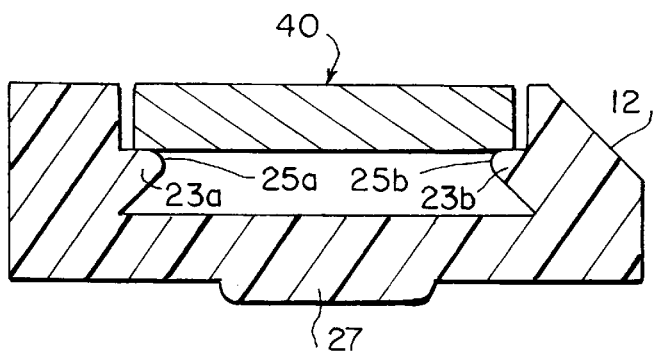
FIG.2
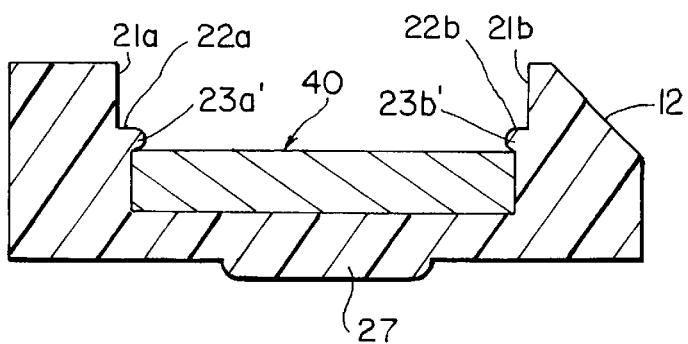
FIG.3

BELLOWS-TYPE COVER WITH INTEGRATED CLAMPING MEMBER

This application is a continuing application of my prior application Ser. No. 08/804,078, filed on Feb. 21, 1997 and entitled "Bellows-Type Cover With Integrated Clamping Member" which is a continuation application of my Provisional Application Ser. No. 60/018,024 filed May 21, 1996. This application claims the benefit of my prior application Ser. No. 08/804,078, filed on Feb. 21, 1997 and of my U.S. Provisional Application Ser. No. 60/018,024, filed on May 21, 1996.

FIELD OF THE INVENTION

The invention relates to a bellows-type cover made from elastic material, such as rubber or plastic material, used, for instance, for the protection of universal joints and drive shafts in which a clamping member or members such as hose clamps or shrinkable compression rings are integrated with the bellows-type cover.

BACKGROUND OF THE INVENTION

Flexible or elastic bellows-type covers usually of accordion-like construction, such as axle boots for universal joints or for drive shafts must be carefully sealed to protect the lubricant. Such bellows-type covers have been used extensively in the automotive industry, for example, with front-wheel drive vehicles. They are normally fastened to the axle stub shafts by means of hose clamps or shrinkable compression rings. A need exists at present on the part of manufacturers of universal joint shafts or drive shafts for bellows-type covers in which clamping members in the form of "Oetiker" hose clamps or "Oetiker" shrinkable compression rings are already integrated into the bellows-type covers. In other words, the manufacturers desire a product in which the clamping members are already integrated at or in the bellows-type covers which favors the automatic assembly of the universal joint or drive shafts in that the bellows-type covers provided with integrated clamping members are available as preassembled parts so as to avoid the need for mounting the clamping members on the bellows-type covers only at the final assembly as is the case today.

SUMMARY OF THE INVENTION

Two possibilities exist, in principle, for a clamping member to be integrated into the bellows-type cover which consist of (1) the clamping member vulcanized into the bellows-type cover or (2) a self-holding arrangement for a clamping member adapted to be mounted on the bellows-type cover. Of these two possibilities, the first solution involving the clamping member vulcanized into the bellows-type cover can be disregarded because such an arrangement is practically not feasible with the usual hose clamps presently used as clamping members as also with compression rings used as clamping members. For example, a stepless hose clamp of the type disclosed in U.S. Pat. No. 4,299,012, which has been used extensively with axle boots in the automotive industry, if vulcanized into the bellows-type cover, would present great difficulty of being tightened by deforming the "Oetiker" ear. The vulcanized-in solution is also unacceptable because of substantial increase in costs. A shrinkable compression ring, vulcanized into the bellows-type cover can no longer be shrunk by means of the presently available tools because these tools are designed to engage during the shrinking operation with the external surface of the compression ring having a predetermined diameter in a form-locking manner in order to reduce the compression ring in its diametric dimension by the application of radial forces. The layer of rubber or plastic material applied over the vulcanized-in shrinkable compression ring formed by the vulcanizing operation prevents a form-locking connection between the compression ring and the compression tool. Equally inappropriate are arguments that vulcanizing-in of the clamping members into the bellows-type covers provides a corrosion protection of the integrated hose clamps or compression rings because these problems can be readily avoided in the present invention by the use of appropriate materials for the clamping devices, such as stainless steel or aluminum. Furthermore, a vulcanizing-in of the clamping members precludes any visual control provided at the clamping member in the installed condition insofar as correct positioning and seating of the clamping member and proper tightening of the clamping member are concerned. Visual inspection of indications relating to manufacturer of the clamping members and/or installation dates would also become impossible. Up to the present, hose clamps used with drive or universal joint shafts have served extensively as information carriers in that dates such as assembly dates or other relevant dates of interest to the manufacturer were integrated into the clamping devices, for example, by stamping. Such visual inspections and controls are possible only as long as the clamping members are freely exposed which is not the case with a vulcanized-in solution.

According to one embodiment of this invention, the preassembled unit consists of a bellows-type cover of rubber or plastic material and of an "Oetiker" shrinkable compression ring or hose clamp of metal, both readily mass-producible items, in which the clamping member, as customary to date, is installed into a groove-shaped recess formed in the external diameter for receiving the clamping member at both ends of the bellows-type cover, i.e., in the small as also in the large outer diameter area of the bellows-type cover. To date, such groove-shaped recesses serve exclusively for the correct guidance of the clamping member in the fully installed condition but are unable to provide any self-retaining function for a preassembled clamping member such as a compression ring integrated into the bellows-type cover.

According to a preferred embodiment of this invention, the groove-shaped recess for the clamping member is of two-tier construction in that it is now provided with at least one, preferably with several, support elements along the circumference thereof which position and hold the compression ring in a selfretaining manner, once placed into the recess prior to tightening or shrinking of the clamping member. The clamping member, such as a compression ring, can now be removed again from the bellows-type cover only with the use of large forces. As a result thereof, the clamping member such as a compression ring which is now automatically retained after being mounted on the bellows-type cover within the groove-shaped recess, now forms an integrated unit with the bellows-type cover for further processing the integrated unit of bellows-type cover and clamping member. The use of support elements offers the advantage of providing a two-tier structure for accommodating the clamping member in which the radially outer position securely but only temporarily holds the clamping member as a part integrated into the bellows-type cover yet permits complete, reliable tightening of the clamping member by releasing the temporary radially outer position in the presence of predetermined tightening forces. The term "clamping member" is used in this application to describe both conventional clamps such as "Oetiker" stepless clamps as presently used with bellows-type covers as also shrinkable compression rings such as "Oetiker" puzzle lock compression rings as disclosed in U.S. Pat. Nos. 5,001,816 and 5,185,908.

BRIEF DESCRIPTION OF THE DRAWINGS

These and other objects, features and advantages of this invention will become more apparent from the following description when taken in connection with the accompanying drawing which shows, for purposes of illustration only, one embodiment in accordance with the present invention, and wherein:

FIG. 1 is a partial axial cross-sectional view through an end part of a bellows-type cover in accordance with the present invention;

FIG. 2 is an enlarged partial axial cross-sectional view through one end of the bellows-type cover of FIG. 1, showing a clamping member in the form of a compression ring in the integrated, preassembled condition;

FIG. 3 is an enlarged partial axial cross-sectional view, similar to FIG. 2, showing the clamping member in the fully installed condition after the shrinking operation;

FIG. 4 is a partial elevational view of the bellows-type member with some dimensional indications; and FIG. 5 is a top plan view on FIG. 4.

DETAILED DESCRIPTION OF THE DRAWINGS

Referring now to the drawing wherein like reference numerals are used throughout the various views to designate like parts, reference numeral 10 generally designates a bellows-type cover of elastic material such as rubber or plastic material which may be of any known construction. The two-tier arrangement provided, for example, at the large end of the bellows-type cover 10 is generally designated by reference numeral 11 which is provided with a circumferentially extending, groove-shaped recess generally designated by reference numeral 20 that provides the two-tier positioning of the clamping member. Recess 20 is provided with side walls 21a and 21b spaced in the axial direction from one another a distance c (FIG. 4) slightly greater than the width of the clamping member generally designated by reference numeral 40. The radial depth d is thereby slightly larger than the thickness of the clamping member 40. The radially outer position of the two-tier structure is formed by the at least approximately horizontally extending surfaces 22a and 22b of at least one pair, but preferably several pairs, of support members 23a and 23b extending toward one another in the recess 20. The lower surfaces 24a and 24b of the support members 23a and 23b which are triangularly shaped in cross section extend at an angle downwardly outwardly to the side surfaces 21a and 21b. The connection between the top surfaces 22a and 22b and the inclined lower surfaces 24a and 24b are preferably rounded off at 25a and 25b. The support members 23a and 23b are integral with the larger end 11 of the bellows-type cover 10 and are therefore made of the same elastic material which permits yielding thereof. As shown in FIG. 2, the support members 23a and 23b of a pair of support members of which preferably several, such as three or four, are distributed uniformly over the circumference of the recess 20 retain the clamping member 40 such as an "Oetiker" puzzle-lock compression ring in the preassembled condition in which the clamping member 40 is securely held integrated with the bellows-type cover 10 because of the self-retaining function of the upper part of the groove-shaped recess 20 disposed radially outwardly of the detent-like members 23a and 23b. Upon application of tightening forces, the support members 23a and 23b, which form protruding lip-like elements, are able to yield to permit the clamping member 40 to enter the radially inward part of the groove-shaped recess 20 in which they are then firmly held in position on the bottom 26 of the groove-shaped recess as a result of the tightening, respectively, shrinking of the diametric dimension thereof. The elastic support members 23a and 23b are then able to spring back to project again over the radially outer surface of the clamping member 40 in the form indicated in FIG. 3 and designated by reference numeral 23a' and 23b'.

As mentioned above, the use of groove-shaped recesses in the external surfaces of the ends of bellows-type covers are known. However, up to now, they merely served the purpose of guiding the clamping member in the fully installed condition. The problem of providing a two-tier arrangement in which a self-holding feature is also attained in the radially outer position would not be attainable without the use of the support members 23a and 23b because even a deeper recess would not safely provide the self-retaining action necessary to constitute the clamping member as a part integrated into the bellows-type cover because of the likelihood of the clamping member becoming detached again from the bellows-type cover when one side of the clamping member enters the groove-shaped recess to abut at the bottom of the recess, in which case the opposite side would be able to slip out over the edge of the recess. Support members in the form of elastic lip-like projections extending toward one another which provide a temporary radially outer position of the two-tier arrangement with a completely safe retaining function to achieve the required integration are therefore necessary to assure an assembly of a bellows-type cover with integrated clamping member. The external surface 12 of the outer end of the bellows-type cover 10 is thereby inclined to form a rectilinearly obliquely upwardly extending flank to assist in centering and mounting the clamping ring in the groove-shaped recess of the self-retaining arrangement.

The following is a typical example of one embodiment of a two-tier arrangement in accordance with this invention, it being understood that this example is merely provided for illustrative purposes, but is not to be construed as limitative of this invention which may be modified as known to those skilled in the art.

The bellows-type cover 10 is made, for example, of Hytrell® and is to be fastened over a metallic axle stub by means of a shrinkable compression ring such as an "Oetiker" puzzle-type compression ring as disclosed in the two aforementioned U.S. patents. The compression ring has a nominal diameter of 88 mm. to be shrunk to a diametric dimension of 85 mm. which corresponds to the diametric dimension of the bottom 26 of the recess 11. The width c of the radially outer portion of the groove-shaped recess 11 delimited by the side walls 21a and 21b is thereby 9.6 mm., the axial spacing e between the tips of the lip-like support members 23a and 23b is 7.85 mm., the radius of curvature of the rounded-off portions 25a and 25b is 0.3 mm., the angle of the lower inclined surfaces 24a and 24b with respect to the radial direction is 45°, the width of the intersection of the surfaces 24a and 24b with the side walls of the recess 11 is 10 mm., the overall dimension g of the large end portion of the bellows-type cover is 15 mm., the depth d of the groove-shaped recess 20 is 3 mm., and the depth d' of the recess formed radially outwardly of by the upper support surfaces 22a and 22b is 1.5 mm. The overall thickness k of the end section 11 is 4.5 mm. while the radially inwardly extending circumferential projection 27 preferably centered with respect to the recess 11, has a radially inward extension m of 0.5 mm., and has an axial length 1 of 5 mm. while the radii of curvature R1 are 0.5 mm.

While I have shown and described only one embodiment in accordance with the present invention, it is understood that the same is not limited thereto but is susceptible of numerous changes and modifications as known to those skilled in the art. The two-tier arrangement may be used with any type of bellows made from any appropriate known elastic material whereby the support members are designed to provide the required elasticity considering the material used for the bellows-type cover and the need for yieldingness to permit a release of the temporary radially outer position of the integrated clamping member. Furthermore, the support members may be arranged in the groove-shaped recess so as to axially face one another pairwise but may also be arranged in staggered relationship so that one support member on one side is followed staggered in the circumferential direction by the next support member on the other side of the recess and so on. Additionally, the flank surface 12 need not be rectilinear but may also have a curved configuration of any appropriate shape. I therefore do not wish to be limited to the details shown and described herein but intend to cover all such changes and modifications as are encompassed by the scope of the appended claims.

I claim:

1. A bellows-type cover member adapted to form a pre-assembled unit with an integratable clamping member when installed, comprising groove-shaped recess means in the bellows-type cover member adapted to receive a clamping member, said recess means having a radially inward, circumferentially extending bottom surface which is adapted to be engaged by a clamping member when in the fully installed position thereof, and at least one pair of yieldable support members forming a temporary bottom at a level in said recess means intermediate said bottom surface and the radially outer boundaries of said recess means, said temporary bottom being operable to hold a clamping member when installed in a pre-assembly position within said recess means to prevent engagement with the bottom.

2. The cover member of claim 1, wherein said yieldable support members are operable to release the temporary bottom in the presence of radially inwardly directed forces to enable a clamping member when preassembled to move from said pre-assembly position to the fully installed position.

3. The cover member of claim 1, wherein said yieldable support members are disposed at said level providing said temporary bottom.

4. The cover member of claim 1, wherein several pairs of yieldable support members are provided along the circumference of said recess means.

5. The cover member of claim 1, wherein a respective pair of yieldable support members is formed by a pair of elastic lip-like projections extending from opposite side walls of said recess means toward one another.

6. The cover member of claim 5, wherein said lip-like projections are of approximately triangular shape in cross section and have a substantially axially extending top surface forming said temporary bottom, and wherein said top surface is located at about half the depth of said recess means.

7. The cover member of claim 5, wherein said bellows-type cover member has an oblique external surface slanting radially outwardly toward said recess means adapted to assist in mounting and centering a clamping member during emplacement in said recess means.

8. The cover member of claim 1, wherein said bellows-type cover member has an oblique external surface slanting radially outwardly toward said recess means adapted to assist in mounting and centering a clamping member during emplacement in said recess means.

9. An assembly of a bellows-type cover means with a pre-assembled integrated clamping member adapted to be received in a groove-shaped recess means provided in the bellows-type cover means, and further means providing a two-tier positioning of the clamping member in which, in a first position, the clamping member is integrated with the bellows-type cover means corresponding to a not-yet-tightened condition of the clamping member and, in a second position, the clamping member is in the installed tightened position, said further means including yieldable support members forming a temporary bottom at a level in said recess means intermediate the bottom surface thereof and the radially outer boundaries of said recess means, for holding said clamping member in the not-yet-tightened condition within said recess means such that said clamping member does not touch the bottom surface of said recess means.

10. The assembly of claim 9, wherein said further means is operable to provide a self-retaining action on the clamping member in said first position at a substantially constant radial distance with respect to the bellows-type cover means.

11. The assembly of claim 9, wherein said further means is formed by axially extending projection means for non-removably retaining the clamping member in said recess means, and wherein said projection means are yieldable in the presence of tightening forces seeking to displace the clamping member from the first to the second position.

12. The assembly of claim 11, wherein said projection means are approximately triangularly shaped with a top surface substantially parallel to the axis of the bellows-type cover means and an inclined surface extending from the tip of the projection means at an acute angle radially inwardly and toward the side surface of the recess means.

13. The assembly of claim 11, wherein one side of the recess means is formed by a part of the bellows-type cover means having an inclined external surface to facilitate installation of the clamping member to be integrated in the bellows-type cover means.

14. The assembly of claim 9, wherein one side of the recess means is formed by a part of the bellows-type cover means having an inclined external surface to facilitate installation of the clamping member to be integrated in the bellows-type cover means.

15. The combination of a bellows-type cover member and an integratable clamping member to form a preassembled unit, comprising groove-shaped recess means in the bellows-type cover member for receiving said clamping member, said recess means having a radially inwardly circumferentially extending bottom surface for engagement by said clamping member in the fully installed position thereof, and at least one pair of yieldable support members forming a temporary bottom at a level in said recess means intermediate said bottom surface and the radially outer boundaries of said recess mean, for holding said clamping member in the preassembly position within said recess means such that said clamping member does not touch the bottom surface of said recess means.

16. The combination according to claim 15, wherein a respective pair of yieldable support members is formed by a pair of elastic lip-like projections extending from opposite side walls of said recess means toward one another, said bellows-type cover member having an oblique external surface slanting radially outwardly toward said recess means to assist in mounting and centering said clamping member during emplacement in said recess means.

* * * * *